(12) United States Patent
Li

(10) Patent No.: US 9,167,492 B2
(45) Date of Patent: Oct. 20, 2015

(54) CELL HANDOVER AND ACTIVATION IN HETEROGENEOUS NETWORKS

(71) Applicant: FUJITSU LIMITED, Kawasaki-shi, Kanagawa (JP)

(72) Inventor: Zhaojun Li, Guildford Surrey (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/183,080

(22) Filed: Feb. 18, 2014

(65) Prior Publication Data

US 2014/0349654 A1 Nov. 27, 2014

(30) Foreign Application Priority Data

May 24, 2013 (EP) .................................... 13169213

(51) Int. Cl.
*H04W 36/00* (2009.01)
*H04W 36/20* (2009.01)
*H04W 84/04* (2009.01)

(52) U.S. Cl.
CPC .......... *H04W 36/0094* (2013.01); *H04W 36/20* (2013.01); *H04W 84/045* (2013.01)

(58) Field of Classification Search
CPC . H04W 16/32; H04W 36/00; H04W 36/0061; H04W 36/0083; H04W 36/0088; H04W 36/08; H04W 36/16; H04W 36/20; H04W 36/24; H04W 36/30; H04W 36/34; H04W 36/36; H04W 36/38; H04J 1/0023; H04J 11/005; H04J 11/0056
USPC ...................... 455/67.11, 115.1, 226.1, 414.1, 455/436–444, 423; 370/331–334
See application file for complete search history.

(56) References Cited

U.S. PATENT DOCUMENTS

| 6,321,089 | B1 | 11/2001 | Han |
| 6,445,917 | B1 | 9/2002 | Bark et al. |
| 6,982,959 | B1 | 1/2006 | Salonaho et al. |

(Continued)

FOREIGN PATENT DOCUMENTS

| EP | 1740007 | 1/2007 |
| WO | 9731487 | 8/1997 |

(Continued)

OTHER PUBLICATIONS

Extended European search report issued for corresponding European patent application No. 13169213.9, dated Oct. 14, 2013.

(Continued)

*Primary Examiner* — Michael Mapa
(74) *Attorney, Agent, or Firm* — Myers Wolin, LLC

(57) ABSTRACT

A scheme to identify the uplink border between two neighboring cells (10, 20) in an LTE-based heterogeneous network, especially one Macro cell (10) and another Small Cell (20). A trigger event is configured for a connected mode UE (1) such that the UE is triggered to send the measurement report about the neighboring cell (20) when the condition "neighbor is offset better than Pcell on UL" is fulfilled. Such a measurement report can be used by the current serving eNB (11) to decide whether one or more neighboring cells (20) should be activated or handed-over to, and/or whether certain information should be sent to one or more neighboring eNBs (21) so that they can start monitoring the uplink connection quality of the UE. In particular it is possible to offload at least part of the UE's uplink traffic from the serving cell (10) to a neighbor cell (20).

14 Claims, 5 Drawing Sheets

(56) References Cited

U.S. PATENT DOCUMENTS

| | | | |
|---|---|---|---|
| 7,003,290 | B1 | 2/2006 | Salonaho et al. |
| 7,499,701 | B2 | 3/2009 | Salonaho et al. |
| 7,580,362 | B2 | 8/2009 | Timus |
| 7,920,517 | B2 | 4/2011 | Bachl et al. |
| 8,358,982 | B2 | 1/2013 | Van Der Velde et al. |
| 2007/0015511 | A1* | 1/2007 | Kwun .................. H04W 36/30 455/436 |
| 2009/0005029 | A1 | 1/2009 | Wang et al. |
| 2009/0163208 | A1 | 6/2009 | Rao |
| 2009/0286563 | A1* | 11/2009 | Ji ......................... H04W 48/20 455/501 |
| 2010/0216470 | A1 | 8/2010 | Pamp et al. |
| 2011/0021197 | A1 | 1/2011 | Ngai |
| 2011/0170418 | A1 | 7/2011 | Sågfors et al. |
| 2014/0087782 | A1* | 3/2014 | Zhang et al. .................. 455/522 |
| 2014/0287726 | A1* | 9/2014 | Jang et al. ..................... 455/411 |

FOREIGN PATENT DOCUMENTS

| | | |
|---|---|---|
| WO | 9943177 | 8/1999 |
| WO | 2008157800 | 12/2008 |
| WO | 2009085128 | 7/2009 |
| WO | 2009142559 | 11/2009 |

OTHER PUBLICATIONS

Turkka et al.; "Using LTE Power Headroom Report for Coverage Optimization"; Vehicular Technology Conference, 2011 IEEE; pp. 1-5; Sep. 5, 2011.
ETSI TS 136 300 V8.12.0; LTE; Evolved Universal Terrestrial Radio Access (E-UTRA) and Evolved Universal Terrestrial Radio Access Network (E-UTRAN); "Overal description; Stage 2 (3GPP TS 36.300 version 8.12.0 Release 8)"; Apr. 2010.
ETSI TS 136 331 V10.0.0; LTE; Evolved Universal Terrestrial Radio Access (E-UTRA); Radio Resource Control (RRC); "Protocol specification (3GPP TS 36.331 version 10.0.0 Release 10)"; Jan. 2011.
ETSI TS 136 423 V10.1.0; LTE; Evolved Universal Terrestrial Radio Access Network (E-UTRAN); "X2 Application Protocol (X2AP) (3GPP TS 36.423 version 10.1.0 Release 10)"; Apr. 2011.
ETSI TS 136 413 V10.6.0; LTE; Evolved Universal Terrestrial Radio Access Network (E-UTRAN); "S1 Application Protocol (S1AP) (3GPP TS 36.413 version 10.6.0 Release 10)"; Jul. 2012.

* cited by examiner

CELL HANDOVER AND ACTIVATION IN HETEROGENEOUS NETWORKS

CROSS-REFERENCE TO RELATED APPLICATIONS

This is a continuation of European Application No. 13169213.9, filed on May 24, 2013, now pending, the contents of which are herein wholly incorporated by reference.

FIELD OF THE INVENTION

The present invention relates to mechanisms for triggering handover or cell activation in cellular wireless networks, particularly but not exclusively in heterogeneous networks (HetNets).

BACKGROUND OF THE INVENTION

Cellular wireless networks are widely known in which base stations (BSs) communicate with terminals (also called user equipments (UEs), or subscriber or mobile stations) within range of the BSs.

The geographical areas covered by base stations are generally referred to as cells, and typically many BSs are provided in appropriate locations so as to form a network or system covering a wide geographical area more or less seamlessly with adjacent and/or overlapping cells. (In this specification, the terms "system" and "network" are used synonymously except where the context requires otherwise). In each cell, the available bandwidth is divided into individual resource allocations for the user equipments which it serves. The terminals are generally mobile and therefore may move among the cells, prompting a need for handovers between the base stations of adjacent and/or overlapping cells.

Handover in wireless systems is conventionally based on downlink (DL) signal quality: when the DL signal quality as measured by the mobile terminal using reference signals transmitted by the base stations drops below a certain threshold, the terminal is handed over to one of the suitable neighbours. Normally, such a handover is effective both for the downlink and the uplink.

One type of cellular wireless communication network is based upon the set of standards referred to as Long-Term Evolution (LTE). In LTE, the measurement most commonly used for handover is the Reference Signal Received Quality (RSRQ), which is an indicator of the wanted signal quality which takes into account the interference levels, or the Reference Signal Received Power (RSRP). The terminal (referred to as a UE in LTE) then uses channel reciprocity to estimate the required power settings for the uplink (UL), by knowing the transmission power of the DL reference signals (which is broadcast by the base station, referred to in LTE as the eNB) and their received power (which the UE measures).

As the UE moves out of the coverage area of its current serving cell, after the RSRQ or RSRP with respect to a neighbour cell exceeds, by a sufficient margin called the "offset", the RSRQ/RSRP with respect to the serving cell, the terminal transmits this information to the base station of the serving cell, and in one form of handover the serving base station or a higher-level node determines that a handover is required to another "destination" base station. However, various forms of handover are possible in wireless communication networks; for example, the handover decision may be taken by the "destination" base station or even at the terminal.

As an embodiment of the present invention will be described later with respect to LTE, it may be worth briefly outlining some relevant aspects of LTE network topology.

The network topology in LTE is illustrated in FIG. 1. As can be seen, each UE 1 connects over a wireless link via a Uu interface to an enhanced node-B or eNB 11. It should be noted that various types of eNB are possible having differing transmit powers and therefore providing coverage areas (cells) of differing sizes. Multiple eNBs deployed in a given geographical area constitute a wireless network called the E-UTRAN (and henceforth generally referred to simply as "the network").

Each eNB 11 in turn is connected by a (usually) wired link using an interface called S1 to higher-level or "core network" entities 101, including a Serving Gateway (S-GW), and a Mobility Management Entity (MME) for managing the system and sending control signalling to other nodes, particularly eNBs, in the network. In addition (not shown), a Packet Data Network (PDN) Gateway (P-GW) is present, separately or combined with the S-GW, to exchange data packets with any packet data network including the Internet. Thus, communication is possible between the LTE network and other networks, including other cellular wireless communication networks. It should be noted that in the same geographical area, distinct E-UTRANs (or radio access networks—RANs) may exist using the same, or different, radio access technology (RAT). These networks may be under control of the same operator, or may be coordinated in another way. Thus, inter-RAN and inter-RAT handovers are also possible.

Radio resource management (RRM) is an important aspect in wireless communication networks in order to ensure the efficient use of the available radio resources and to provide mechanisms that enable network to meet radio resource related requirements. In particular, RRM in E-UTRAN provides means to manage (e.g. assign, re-assign and release) radio resources taking into account single and multi-cell aspects. Measurements play a critical role in RRM, especially for mobility and scheduling. Generally network control and configure UEs' measurement and measurement reporting functions. In LTE, the two basic UE measurement quantities are the above mentioned Reference symbol received power (RSRP) and the Reference symbol received quality (RSRQ).

Measurements to be performed by a UE for intra/inter-frequency mobility can be controlled by E-UTRAN, using broadcast or dedicated control. In idle mode, the cell reselection algorithms are controlled by setting of parameters (thresholds and hysteresis values) that define the best cell and/or determine when the UE should select a new cell. Also, E-UTRAN broadcasts parameters that configure the UE measurement and reporting procedures. In connected mode, the mobility of radio connections has to be supported. Handover decisions may be based on UE and eNB measurements. In addition, handover decisions may take other inputs, such as neighbour cell load, traffic distribution, transport and hardware resources and operator defined policies into account.

The following 3GPP standards documents contain useful background and are hereby incorporated by reference:
TS36.300 Evolved Universal Terrestrial Radio Access (E-UTRA) and Evolved Universal Terrestrial Radio Access Network (E-UTRAN); Overall description; Stage 2;
TS36.331 Evolved Universal Terrestrial Radio Access (E-UTRA); Radio Resource Control (RRC); Protocol specification;
TS36.413 Evolved Universal Terrestrial Radio Access Network (E-UTRAN); S1 Application Protocol (S1AP); and
TS 36.423 Evolved Universal Terrestrial Radio Access Network (E-UTRAN); X2 Application Protocol (X2AP).

FIG. 1 shows what is sometimes called a "homogeneous network"; that is, a network of base stations in a planned layout and which have similar transmit power levels, antenna patterns, receiver noise floors and similar backhaul connectivity to the core network. Current wireless cellular networks are typically deployed as homogeneous networks using a macro-centric planned process. The locations of the base stations are carefully decided by network planning, and the base station settings are properly configured to maximise the coverage and control the interference between base stations. However, it is widely assumed that future cellular wireless networks will adopt the structure of the so-called "heterogeneous network", composed of two or more different kinds of cell.

FIG. 2 depicts a simple heterogeneous network. The large ellipse 10 represents the coverage area or footprint of a Macro cell provided by a base station (Macro BS) 11. The smaller ellipses 20, 22 and 24 represent Micro cells within the coverage area of Macro cell 10, each having a respective base station (Micro BS), one such base station being shown at 21. Here, the Macro cell is a cell providing basic "underlay" coverage in the network of a certain area, and the Micro cells are overlaid over the Macro cell using separate frequency spectrums for capacity boosting purposes particularly within so-called "hot spot zones". A UE 1 is able to communicate both with Macro BS 11 and Micro BS 21 as indicated by the arrows in the Figure. Thus, for example, the same UE may use both the Macro cell as its "primary" cell (Pcell) and a Micro cell as a "secondary" cell. When a UE starts to use a given cell for its communication, that cell is said to be "activated" for that UE, whether or not the cell is already in use by any other UEs.

The Radio Access Technology (RAT) adopted by the base stations could be any kind, for example, 3G or 4G. Here we assume that a 4G RAT such as 3GPP Long-Term Evolution (LTE) is adopted by each of the cells in the network and use this as an example to illustrate the proposed method. Although only two types of cell, Macro or Micro, are shown in FIG. 2, various levels of cell are under consideration for 4G including so-called Femto and Pico cells. Femto and Pico cells can be overlaid on either Macro or Micro cells as explained below. Also, in LTE each Macro eNB generally is sectorized into N (N>=1) partitions, each of which or any subset of which may constitute a cell. A typical example is for the base station to have three sectors, each of which is configured as a cell with frequency reuse factor being 1. Therefore, references to "cell" therefore include "sector" unless where the context demands otherwise.

A more complex heterogeneous network may consist of Femto, Pico, Micro and Macro base stations. Of these, the operator will have control over Pico, Micro and Macro Base stations. Femto base stations are expected to be installed by users, with backhaul provided by broadband Internet, and consequently activation/deactivation thereof is not under control of the network operator. FIG. 3 shows the operator-controlled cells in part of such a heterogeneous network.

The three biggest cells 10, 12 and 14 represent the Macro cells in the network, while the medium sized cells are Micro cells and the smallest cells are Pico cells. Within each Macro cell, Micro cells exemplified by 26 and 28 provide a first level of additional capacity. It should be noted that Micro cell 28 is at least partly within the coverage area of two Macro cells, 10 and 12. Within the Micro cells, in turn, there are Pico cells illustrated by the small circles and exemplified by 30 and 32. Pico cell 30 is an example of a Pico cell which is within the coverage area of a Micro cell 26, as well as within the coverage area of Macro cell 10. Pico cell 32 is an example of a Pico cell which is within the coverage area of a Macro cell only.

The network is designed such that the Macro cells provide blanket coverage while the smaller Micro and Pico cells are providing additional capacity.

Thus, in addition to the Macro cell to Micro cell relationship shown in FIG. 2, where the Micro cells provide additional capacity to the basic coverage provided by the Macro cells, it is possible to define a Pico cell to Micro cell relationship, where the Pico cells provide additional capacity to that of the Micro cells which are already serving as capacity boosters, as well as a Pico cell to Macro cell relationship, where the Pico cells provide additional capacity to the basic coverage provided by the Macro cells. The above mentioned Femto cells may provide a further layer of coverage. For present purposes, all of the Micro, Pico and/or Femto cells as may be present in a heterogeneous network can be regarded as "Small Cells".

The principal scenario of interest in this invention is an LTE heterogeneous network (HetNet) where UEs operate within the coverage of at least two cells: a Macro Cell and a Small Cell (low power node, e.g. a Pico Cell, a relay or a Femto cell). The Small Cell eNodeB (SCeNB) and the Macro Cell eNodeB (MeNB) are able to exchange information over the X2 interface or S1 interface, through which several procedures/functions can be executed/coordinated between the MeNB(s) and SCeNBs. For example, UEs can be handed over between the neighbouring MeNB(s) and SCeNB(s); or inter-site/eNB carrier aggregation or co-operative multipoint transmission (COMP) can be operated among the neighbouring MeNB(s) and SCeNB(s); or dual connectivity of the UEs can be maintained where UEs have multiple connections with the MeNB(s) and SCeNBs.

SUMMARY OF THE INVENTION

According to a first aspect of the present invention, there is provided a wireless communication method wherein a terminal is within wireless communication range of at least one serving cell with which the terminal has at least uplink communication, and at least one neighbour cell with which the terminal has no uplink communication, the cells controlled by one or more base stations and transmitting at least reference signals for reception by the terminal, the method comprising:
  at the terminal, transmitting signals on the uplink to the serving cell, and measuring signals received from the cells;
  at a base station of the serving cell, measuring signals received on the uplink from the terminal; and
  determining, based on information about the transmitted and received signals, that the terminal is in the vicinity of an uplink border between the serving cell and neighbour cell at which transmitted signals from the terminal are received with similar signal strengths by both cells.

Determining that the terminal is in the vicinity of the uplink border is relevant to activation of the neighbour cell as a secondary cell for contributing at least part of the uplink connectivity of the terminal (or for causing the terminal and/or other cell to initiate further measurements with a view to such activation). In this way it is possible to offload at least part of the terminal (UE)'s uplink traffic to a secondary cell.

The method may further comprise, in response to the determining, the terminal sending a report to the base station of the serving cell. This would be the case for example if the determining is performed in the terminal.

The method may further comprise, in response to the determining or the report, the base station of the serving cell causing the neighbour cell to measure signals received from the terminal. For example the base station controlling the serving cell may request a base station controlling the neighbour cell to begin making such measurements and to report the results to the base station of the serving cell. This can permit a more accurate assessment of the uplink border and consequently, the need for activation/handover if any.

The method may further comprise the base station of the serving cell causing to activate the neighbour cell for uplink wireless communication required by at least one application/ service running on the terminal. In this way the neighbour cell becomes a secondary cell used by the terminal (which may continue to regard the serving cell as its primary cell). This can be regarded as equivalent to a handover to the neighbour cell for at least part of the terminal's uplink communication.

Although it is possible for both the serving and neighbour cells to be controlled (provided) by the same base station, more typically the serving and neighbour cells are controlled by first and second base stations respectively, in which case the first and second base stations are arranged for mutual communication, the first base station sending a request to the second cell base station to measure said signals and/or to activate said uplink wireless communication.

In case the second base station controls a plurality of cells, the request from the first base station preferably identifies the neighbour cell which was the subject of the determining.

It should be noted that the "determining" referred to above can be carried out anywhere in the system. In one embodiment the determining takes place at the base station of the serving cell. In this case the base station of the serving cell receives (from the or each neighbour cell) information from the neighbour cell about transmitted power of the neighbour cell's transmitted signals; and information from the terminal about transmitted power of the signals transmitted by the terminal and the received power of the signals received from the cells.

In another embodiment the determining is performed at the terminal, the terminal receiving:
information from the serving cell about transmitted power of the serving cell's transmitted signals;
information from the serving cell or from the neighbour cell about the transmitted power of the neighbour cell's transmitted signals; and
information from the serving cell about the received power of the terminal's uplink communication.

Preferably, in any case, the determining determines whether the following condition is fulfilled: neighbour cell becomes offset better than serving cell on uplink.

Further, the determining may comprise estimating the received power of the terminal's uplink communication at the neighbour cell. The estimated received power may be associated with the received power of the signal received from the neighbour cell.

According to a second aspect of the present invention, there is provided wireless communication system comprising:
one or more base stations which provide cells for wireless communication; and
a terminal arranged for at least uplink communication with at least one serving cell among said cells, and to detect reference signals from the serving cell and from at least one neighbour cell, wherein:
the terminal is arranged to transmit signals on the uplink to the serving cell, and to measure signals received from the cells;
the base station controlling the serving cell is arranged to measure signals received on the uplink from the terminal; and
the system includes means for determining, based on information about the transmitted and received signals, that the terminal is in the vicinity of an uplink border between the serving cell and neighbour cell at which transmitted signals from the terminal are received with similar signal strengths by both cells.

In one form of the system, the serving and neighbour cells are controlled by first and second base stations respectively, the first and second base stations are arranged for mutual communication, and the first base station is arranged to send a request to the second cell base station to measure signals received from the terminal.

According to a third aspect of the present invention, there is provided a base station for providing a serving cell of a terminal in a wireless communication system, the terminal arranged for at least uplink communication with the serving cell and to detect reference signals from the serving cell and from at least one neighbour cell in the system, wherein:
the base station is arranged to take measurements of signals received on the uplink from the terminal, to receive reports from the terminal and from a base station of the neighbour cell, and to determine, based on the measurements and reports, that the terminal is in the vicinity of an uplink border between the serving cell and the neighbour cell at which transmitted signals from the terminal are received with similar signal strengths by both cells.

According to a fourth aspect of the present invention, there is provided a terminal for use in a wireless communication system, the system comprising one or more base stations which control cells for wireless communication; the terminal arranged for at least uplink communication with at least one serving cell among said cells, and to detect reference signals from the cells including at least one neighbour cell, wherein:
the terminal is arranged to transmit signals on the uplink to the serving cell, to take measurements on signals received from the cells, to receive, from at least the base station controlling the serving cell, reports on signals transmitted from the cells and to determine, based on the measurements and reports, that the terminal is in the vicinity of an uplink border between the serving cell and neighbour cell at which transmitted signals from the terminal are received with similar signal strengths by both cells.

In a further aspect, the present invention provides software in the form of computer-readable instructions which, when executed by a processor of radio equipment, provides the base station or the terminal as defined above. Such software may be recorded on one or more non-transitory storage media.

The term "cell" in this specification is to be interpreted broadly. For example, it is possible to refer to communication channels associated with a cell being transmitted from or by the cell (in the downlink), or transmitted to a cell (in the uplink), even if the transmission or reception is actually carried out by one or more antennas or antenna ports of a base station. The term "cell" is intended also to include sub-cells, which could be sub-divisions of a cell based on using particular antennas or corresponding to different geographical areas within a cell. References to performing certain actions "at a cell" generally implies performing those actions in a base station which provides that cell. The cells may be associated with different base stations or with the same base station. The term "base station" itself has a broad meaning and encompasses, for example, an access point or transmission point.

In general, and unless there is a clear intention to the contrary, features described with respect to one aspect of the invention may be applied equally and in any combination to any other aspect, even if such a combination is not explicitly mentioned or described herein.

As is evident from the foregoing, embodiments of the present invention involve signal transmissions between cells and terminals (UEs) in a wireless communication system. The cells are associated with one or more base stations. A base station may take any form suitable for transmitting and receiving such signals. It is envisaged that the base stations will typically take the form proposed for implementation in the 3GPP LTE and 3GPP LTE-A groups of standards, and may therefore be described as an eNodeB (eNB) (which term also embraces Home eNodeB) as appropriate in different situations. However, subject to the functional requirements of the invention, some or all base stations may take any other form suitable for transmitting and receiving signals from terminals.

Similarly, in the present invention, each terminal may take any form suitable for transmitting and receiving signals from base stations. For example, the terminal may take the form of a user equipment (UE), subscriber station (SS), or a mobile station (MS), or any other suitable fixed-position or movable form. For the purpose of visualising the invention, it may be convenient to imagine the terminal as a mobile handset (and in many instances at least some of the terminals will comprise mobile handsets), however no limitation whatsoever is to be implied from this.

Embodiments of the present invention provide a scheme to identify the uplink border between two neighbouring cell, especially one Macro cell and another Small Cell. The basis of the invention is to define a trigger event which can be configured for a connected mode UE such that the UE will be triggered to send the measurement report about the neighbouring cell(s) when the condition is met. Such a measurement report can be used by the current serving eNB to decide if one or several neighbouring cells should be activated and/or certain information should be sent to one or more neighbouring eNBs so that they can start monitoring the uplink connection quality of the UE.

Embodiments are particularly beneficial in heterogeneous networks where due to power imbalance there exist different uplink and downlink cell borders. The invention can efficiently identify the uplink border in addition to the conventional downlink cell border, as an aid to offloading at least part of the uplink traffic to another cell. Therefore it becomes possible in an efficient manner to maintain connectivity to both macro and Small Cell(s) simultaneously, and to employ one for uplink connectivity and another for downlink for example. On both uplink and downlink, the best suitable cells with the highest signal strength can be chosen to achieve highest throughput. In addition, this mechanism can also reduce the interference in co-channel cases.

BRIEF DESCRIPTION OF THE DRAWINGS

Reference is made, by way of example only, to the accompanying drawings in which.

DETAILED DESCRIPTION

Based on current 3GPP specifications, the UE in E-UTRAN RRC_CONNECTED state makes measurements of attributes of the serving and neighbour cells to enable the network-controlled UE-assisted handovers. The UE is triggered to send a DL measurement report in accordance with rules set by system information, the system specifications and so on. One example of such a trigger is when the measurement result of signals detected by the UE from a neighbour cell exceeds by a predetermined margin ("becomes offset better than"), the measurement result of signals received from the UE's serving cell. The source eNB makes a decision, based on the measurement report and RRM information, to hand over the UE. Generally, the network decides which cell a UE should hand over in order to maintain the radio link based on the UE's measurement reports on downlink quality. This scheme works well in homogeneous networks.

Figure 4A:
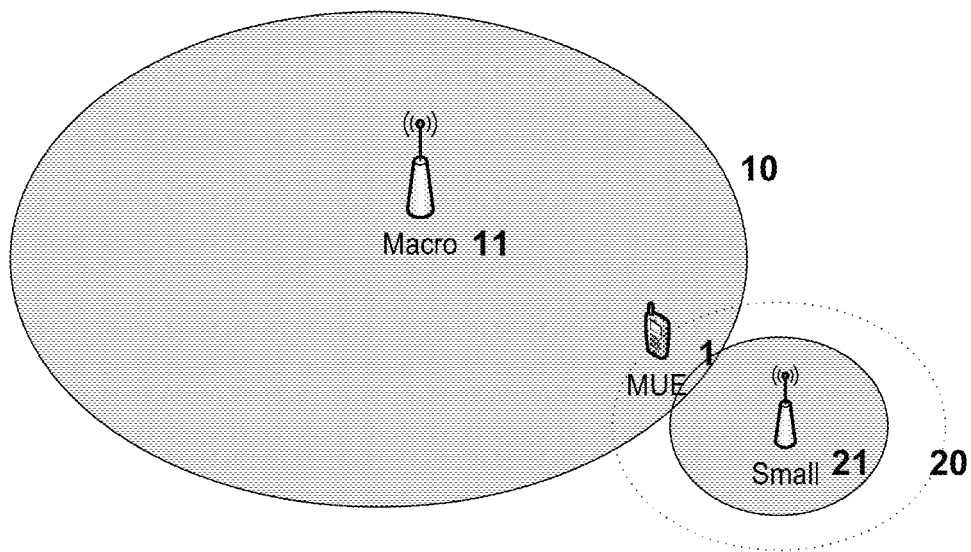
FIGS. 4A and 4B show a Macro Cell and a Small Cell, and UL and DL cell borders thereof.
Figure 4B:
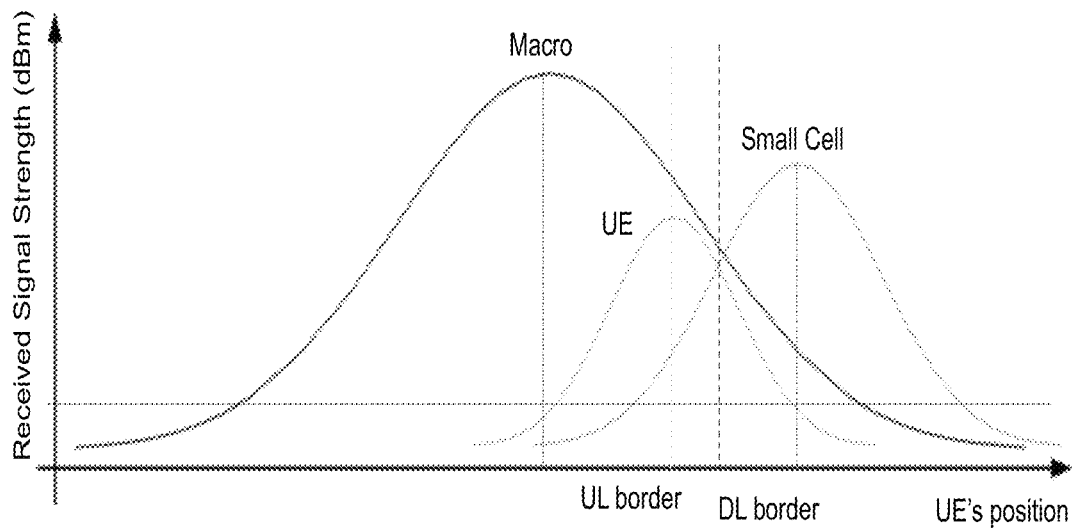

However, eNBs with different sizes and capabilities in heterogeneous networks have different downlink output power. Macro eNBs generally have higher output power than pico or Femto eNBs. The power imbalance in heterogeneous networks may result in the situation where the best cell for a UE to connect with when considering downlink performance may not be the most suitable cell when uplink performance is considered. FIG. 4 illustrates the problem, in which FIG. 4(a) shows a UE 1 within range of a Macro Cell 10 provided by a MeNB 11, and a Small Cell 20 provided by a micro/pico/femto base station 21, and FIG. 4(b) shows a corresponding signal strength graph of signals received at the UE from both cells. The UE is labelled "MUE" in FIG. 4(a), to denote that it is currently being served by the Macro cell.

As illustrated in FIG. 4, the DL border (indicated by the solid ellipses in FIG. 4(a)) is marked where the DL measurement result of the neighbouring cell (e.g. Macro cell 10 in the figure) equals that of the serving cell (e.g. Small Cell 20 (Pico/Femto cell) in the figure), while the UL border (the edge of the hashed area round the Small Cell in FIG. 4(a)) represents the point where the uplink signal from the MUE 1 has equal received power at both Macro cell and Small Cell (see FIG. 4(b)). The horizontal dashed line in FIG. 4(b) shows that the eNBs receive equal uplink signal strength from the UE when the UE is on at the uplink cell border.

Conventionally, the border between two cells is determined based on DL performance, i.e. the DL border shown by the solid line in FIG. 4(a). In the cases where the Macro and Small Cells operate on the same frequency, when a UE served by the Macro cell moves close to or beyond the UL border, the UL transmission from such UE may introduce severe interference to the neighbouring Small Cell. This interference refers to the interference to users in the Small Cell, caused by the UL transmission of the UE which is currently being served by the Macro Cell.

On the other hand, if Cell Range Expansion (CRE) is configured in the network in order to increase traffic offloading from the Macro to the Small Cells, the handover trigger algorithm can be biased so that a UE is likely to be handed over to a Small Cell even if the Small Cell DL signal strength is lower than that of the Macro Cell. Consequently, the UE near the border with the Macro cell but connected to the Small Cell may experience strong interference from the Macro cell (namely, interference to the UEs which are currently served by the Small Cell, on the DL caused by the Macro Cell).

Considering the difference of UL and DL cell borders in heterogeneous networks, one conceivable solution could be to maintain connectivity to both cells simultaneously, and use one for UL connectivity and another for DL. On the DL, typically it is sufficient to rely on the UE's measurement results to choose the cell with the highest signal strength to achieve highest downlink throughput. In principle the same can be applied to UL. Typically a UE selects a cell to connect based on DL performance; therefore it is easy to choose the best suitable cell for DL connectivity; however, it is more difficult on the UL. Although the eNB can configure a UE to transmit sounding reference signals (SRS) in order for the eNB to monitor UL channel quality, this mechanism can only be used for the serving cell of the UE. In any case, it is desirable to avoid unnecessary measurements and reports in the system, in view of the resource overhead and effect on the UE's power consumption.

Therefore, schemes that identify the UL border between neighbouring cells, especially one Macro cell and another Small Cell are of significant interest.

Embodiments of the present invention provide a triggering mechanism where an event can be configured for a connected mode UE, such that the UE is triggered to send the measurement report about the neighbouring cell(s) when the condition is fulfilled (met). Such a measurement report can be used by the current serving eNB to decide whether the UE should be handed over to a neighbour cell for at least part of its UL transmission and/or whether at least one neighbouring cell should be activated as a secondary cell, and/or whether certain information should be sent to neighbouring eNBs so that they can start monitoring the uplink connection quality of the UE. The prior art does not provide such a triggering event to initiate a neighbouring eNB to monitor the uplink quality of a UE.

In general, unless otherwise indicated, the embodiments described below are based on LTE, where the network operates using FDD or TDD and comprises one or more eNodeBs, each controlling one or more cells, at least one being a downlink cell with a corresponding uplink cell. Each cell may serve one or more terminals (UEs), independently or dependently, which may receive and decode signals transmitted in that serving cell. UEs may be configured to have two or more serving cells at the same or different carrier frequency.

It is assumed that to begin with, a UE is in wireless communication with at least one Pcell (serving cell) and in range of, but not wirelessly communicating with, one or more neighbour cells. In other words the neighbour cells are broadcasting reference signals capable of detection by the UE, but do not receive any UL transmission from the UE and therefore do not make any measurement on the UE.

First Embodiment

In a first embodiment, a judgement is made at the serving eNB. More particularly the eNB determines whether an event trigger "Neighbour becomes offset better than PCell on UL" is fulfilled. This is referred to below as an "entering condition" for the UE to start sending a measurement report on the neighbour cells. Conversely, the above trigger becoming no longer true is a "leaving condition" for causing the UE to stop making such measurements.

The above trigger, which is phrased in the style used in 3GPP specification documents, can be written more fully as:

"Received power at an eNB of a neighbour cell due to a UE's UL transmission, becomes stronger, by an amount corresponding to a predetermined offset value, than the received power at the eNB of the current serving cell (primary cell or Pcell) due to the UE's UL transmission".

It should be noted that the above trigger differs from the conventional "Neighbour becomes offset better than Pcell" because the conventional trigger refers to signal strengths on the DL as measured by the UE. Unlike the conventional trigger, the novel trigger cannot be determined by the UE alone, but rather requires input from the serving and neighbour cell eNB(s).

In the first embodiment, an estimation is performed at eNBs in order to decide the UL border between the serving cell of a UE and the neighbouring cell(s). To do this, the eNB needs at least the following information:
a) The UEs' feedback (or measurement reports) on the Reference Signal Received Power (RSRP) of both serving cell(s) and neighbouring cells on the DL;
b) The UEs' transmission power (of a specific UL channel, e.g. PUCCH or PUSCH; or specific UL transmission, e.g. SRS);
c) Reference-signal transmission power of the neighbouring cells provided by the neighbouring eNBs.

Item c) here refers to the transmission power used by neighbouring eNBs to transmit reference signals of the neighbour cells. This information can be provided to the Pcell eNB over the backhaul network via the X2 interface for example.

Together with the eNB's own transmission power information and the eNB's measurement of UL received power from the UE, the eNB is able to estimate the received power at the neighbouring cells on the UL, and associate it with the corresponding measurement results by the UE on the DL. That is, the eNB can estimate the power with which each neighbour eNB receives SRS (or any other transmission such as PUCCH or PUSCH) from the UE.

For example, considering the DL signal received at the UE from each cell (item a) above), when the RSRP from the serving cell decreases to certain degree while the RSRP from the neighbouring cell increases to certain degree, it can be estimated that the UE is approaching the UL border where similar or equal signal strength is received on the UL by both cells. With the information in items b) and c), the eNB can estimate the received power at the neighbouring cells on the UL, and associate it with the corresponding measurement results by the UE on the DL.

Therefore the entering and leaving conditions can be defined to trigger UE's measurement report when the entering condition, "Neighbour becomes offset better than PCell on UL", is met. The conditions are defined based on the corresponding measurement results by the UE on the DL.

Second Embodiment

An alternative solution to the first embodiment is to let the UE perform the estimation in order to decide the UL border between the serving cell of a UE and the neighbouring cell(s). In other words the UE determines occurrence of the event trigger "Neighbour becomes offset better than PCell on UL". To do this, the UE needs at least the following information:
a) The transmission power of the serving cell(s) provided by the serving eNB;
b) Reference-signal transmission power of the neighbouring cells provided by the neighbouring eNBs via the serving eNB;
c) The serving eNB's feedback (or measurement reports) on the UL transmissions (e.g. SRS transmission from the UE).

The distinction between items a) and b) above is that the serving cell eNB can provide transmission power of reference signals and/or PDSCH, whilst the neighbour cells can only provide reference signal transmission power since they are assumed not to serve the UE currently.

Together with its own transmission power information and UE's measurement of receive power on the DL from the serving and neighbour cells, the UE should also be able to estimate the received power at the neighbouring cells on the UL, and associate it with its own corresponding measurement results on the DL. For example, when the RSRP from the serving cell decreases to certain degree while the RSRP from the neighbouring cell increases to certain degree, the UE can estimate that it is approaching the UL border where similar or equal signal strength is received on the UL by both cells. Therefore the entering and leaving conditions can be defined to trigger UE's measurement report when the entering condition, "Neighbour becomes offset better than PCell on UL", is met. The conditions defined in this embodiment are based on the estimated results of signal strength received by the neighbouring cells on the UL.

Estimation Method

An example will now be given of how the eNB (in the first embodiment) or UE (in the second embodiment) performs the estimation referred to above. Below, the suffix "s" refers to the serving cell, "n" to a neighbour cell", "ue" to the UE, "r" to a received signal and "t" to transmission.

Considering that a rough estimation would serve the purpose (associating UE's DL measurement with the power at eNB on UL) the free space path-loss model can assumed. It is also assumed that DL and UL path-loss are similar. Then the path loss can be given by the ratio:—

$$FSPL = P_t/P_r,$$

Where $P_t$ is the total power transmitted (in watts) and $P_r$ is the received power.

On either the UE side or the eNB side, with the following information available (as stated earlier):

The transmission power of the serving cell(s) provided by the serving eNB; ($P_{ts}$)

Reference-signal transmit power of the neighbouring cells provided by the neighbouring eNBs, via the serving eNB; ($P_{tn}$)

The serving eNB's feedback (or measurement reports) on the UL transmissions (e.g. SRS transmission from the UE); ($P_{r\_s}$)

The UE's own transmission power Information; ($P_{tue}$)

The UE's measurement on the Reference Signal Received Power (RSRP) of both serving cell(s) and neighbouring cells on the DL; ($P_{rue}$, $P_{1rue}$)

then, assuming that DL and UL path-loss (FSPL) are similar, for the serving cell:

$$FSPL \text{ on } UL = P_{tue}/P_{r\_s};$$

$$FSPL \text{ on } DL = P_{ts}/P_{rue}$$

and $$P_{tue}/P_{r\_s} = P_{ts}/P_{rue} \rightarrow P_{r\_s} = P_{rue} P_{tue}/P_{ts} \quad (1)$$

Similarly, for the neighbour cell:

$$FSPL \text{ on } UL = P_{tue}/P_{r\_n};$$

$$FSPL \text{ on } DL = P_{tn}/P_{1rue}$$

$$P_{tue}/P_{r\_n} = P_{tn}/P_{1rue} \rightarrow P_{r\_n} = P_{1rue} P_{tue}/P_{tn} \quad (2)$$

Figure 1:
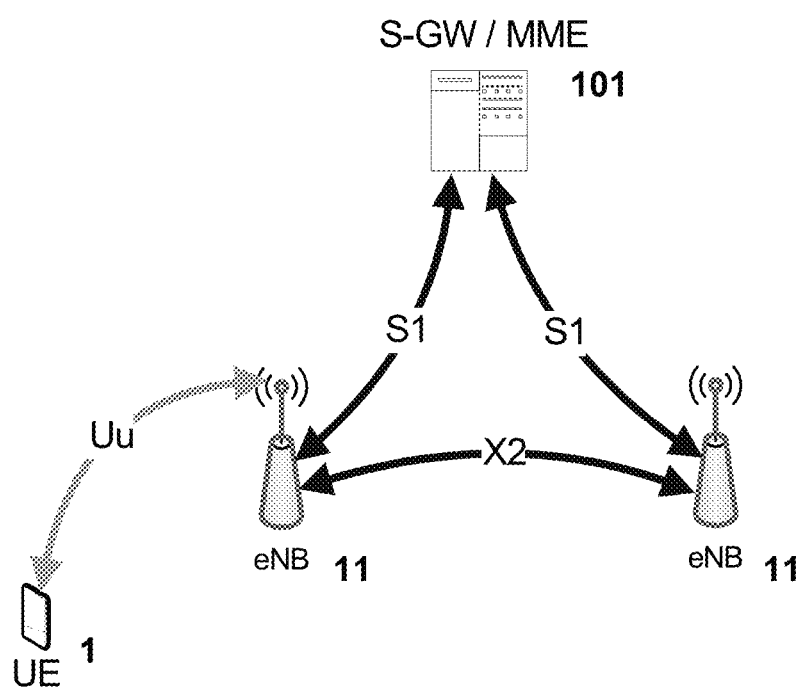
FIG. 1 shows a network topology in LTE.
Figure 2:
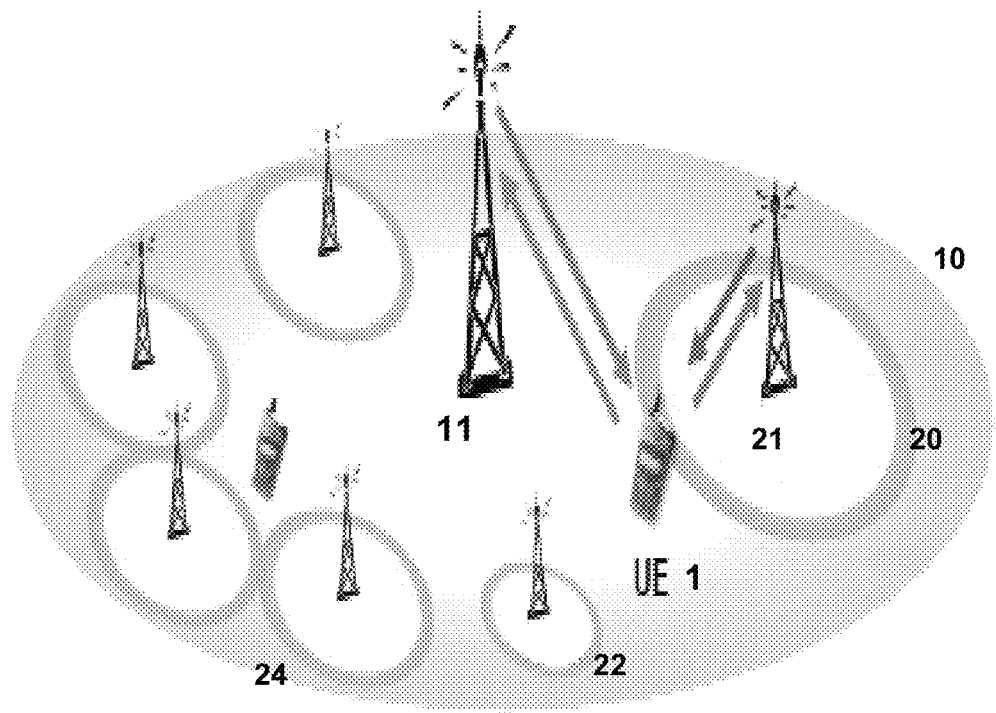
FIG. 2 illustrates the principle of a heterogeneous network.
Figure 3:
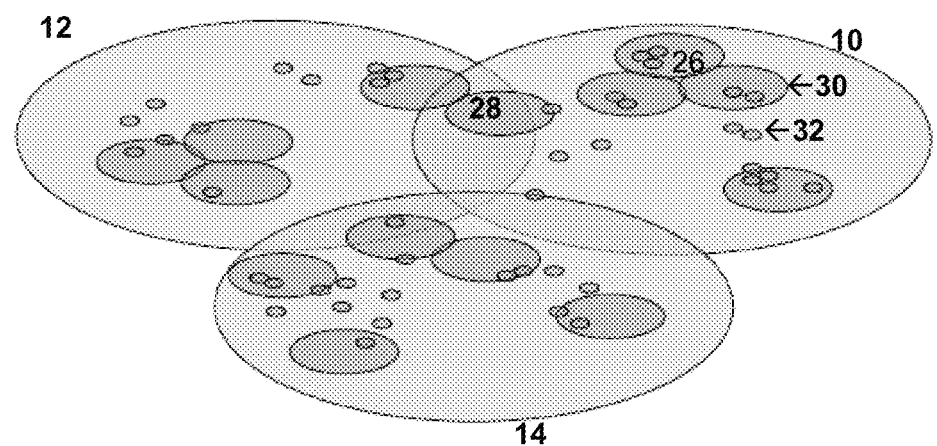
FIG. 3 illustrates operator-controlled cells in a heterogeneous network having overlapping Macro, Micro, and Pico cells.

Using equations (1) and (2), the UE and the eNB can roughly estimate the UL border (i.e. $P_{r\_s} = P_{r\_n}$). By activating the UL monitoring at the neighbour cell, the accurate $P_{r\_n}$ can be obtained from the neighbour eNB's measurement reports (as shown In FIG. 2), therefore the accurate UL border can be determined for a specific UE.

More accurate estimation is also possible by using more complicated models; however this will add more complexity to UE's implementation and cost at least in the second embodiment. In addition, accurate estimation is not required at least where the above process is only used to trigger the activation of the UL monitoring at the neighbour cell to get accurate measurement reports. Thus, usually, it is envisaged to use the above estimation method as a trigger for more accurate measurement of the neighbour cells with a view to possible secondary cell activation/handover, rather than directly leading to activation or handover.

General Mechanism with Information Exchange

Figure 5:
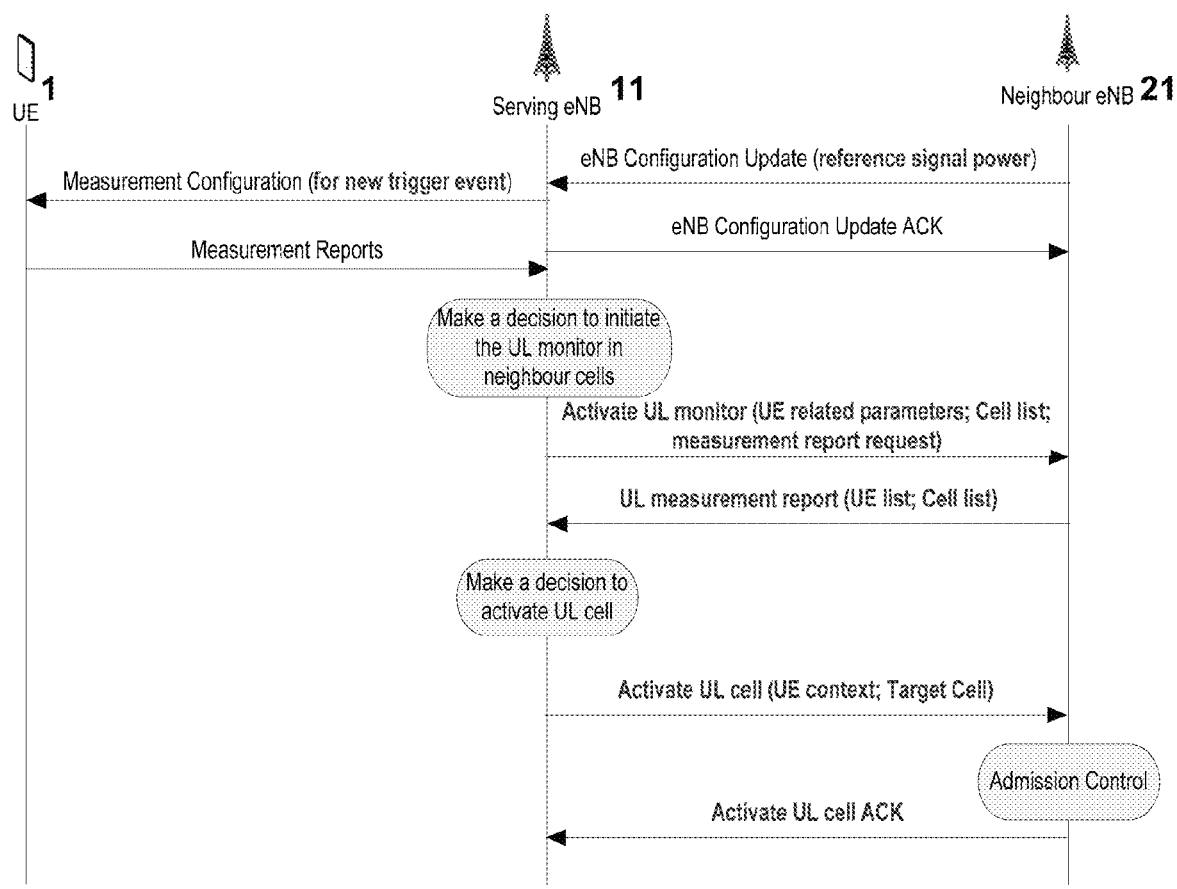
FIG. 5 is a flowchart of a signalling sequence employed in an embodiment of the present invention.

In order to support one or both of the above embodiments, information/message exchange is essential between a UE and its serving cell and between serving and neighbour cells. FIG. 5 shows an example message flow chart for this invention. Note this flow chart is based on the first embodiment where the Pcell eNB performs the estimation to decide the UL border.

As shown in FIG. 5, the novel signalling exchange required between eNBs includes:

(i) Reference-signal power of the neighbouring cells provided by the neighbour eNB(s) 21 to the serving eNB 11. This can be done via the X2 or S1 interface, specifically as part of "eNB Configuration Update" procedure (see the above mentioned TS36.423).

(ii) Once the serving eNB 11 decides to initiate the UL monitoring in the neighbouring cell(s) based on the UE 1's feedback and its own estimation, it sends a request to the neighbour eNB 21 to activate UL monitoring. Related information is included in this request, such as UE specific parameters for the neighbour eNB to perform the UL monitor, and the interested cell list from which the monitor should be performed, as well as the request for measurement report on the results (e.g. event trigger, or periodic report). The list is required because an eNB 21 may control several cells. "Interested" cells are those cells which the eNB 11 has estimated may offer a better service to the UE 1.

(iii) The neighbour eNB 21 will then send measurement reports for the specific UE(s) on the interested cells.

(iv) Based on the measurement report from the neighbour eNB 21, the serving eNB 11 may decide to request to "activate" the neighbour cell for UL data delivery for certain application(s) of the certain UE, to assist in meeting the requirements of those application(s). This can also be viewed as a form of handover of the UE to that neighbour cell for that part of the UL. Here, another application(s) may remain with the existing serving cell, depending on the QoS requirements of different applications being run on the UE.

(v) An activation request is then sent to the neighbour eNB for a target cell for UL, together with the UE context for this service. It is up to the neighbour eNB to decide if it can accept the request. During this procedure, both eNBs will take other information into account, for example by exchanging load information among eNBs as provided for in existing 3GPP standards.

(vi) After admission control procedure, the neighbour eNB may decide to accept the activation request by sending back an acknowledgement.

(vii) In the event that the request in (iv) is not accepted, a second candidate cell (if any) may be considered. Alternatively, multiple activation procedures may be conducted in parallel and it may be left up to the requesting eNB to decide which cell will be activated to serve a specific UE.

Whilst the above process has referred to a single UE, it may of course be repeated for any number of UEs in the same geographical area.

Between a UE 1 and its serving eNB 11, the measurement configuration for the new trigger event is required for this invention as shown in FIG. 5. In addition, to support the second embodiment, novel information exchange is required between a UE and its serving eNB including:

Reference-signal power of the neighbouring cells provided by the neighbouring eNBs via the serving eNB;

The serving eNB's feedback (or measurement reports) on the UL transmissions (e.g. SRS transmission from the UE).

Figure 6:
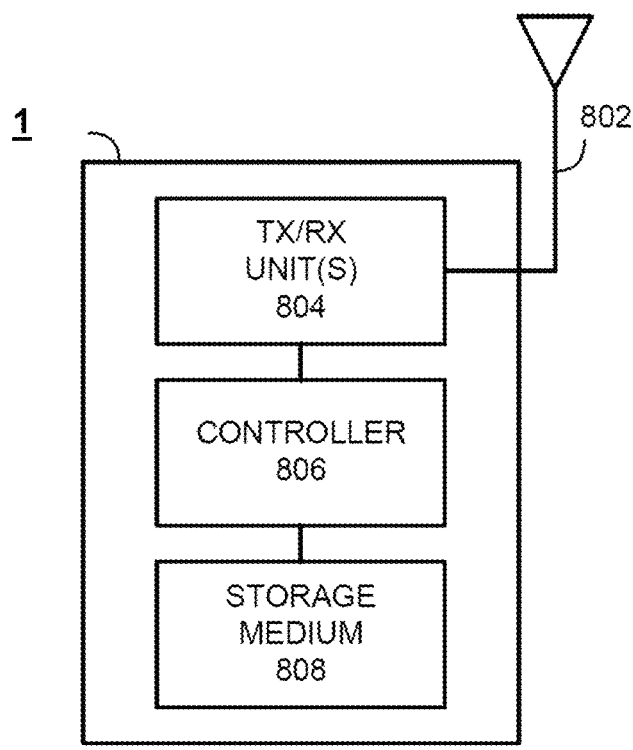
FIG. 6 is a schematic block diagram of a terminal for use in the present invention.

FIG. 6 is a block diagram illustrating an example of a UE 1 to which the present invention may be applied. The UE 1 may include any type of device which may be used in a wireless communication system described above and may include cellular (or cell) phones (including smartphones), personal digital assistants (PDAs) with mobile communication capabilities, laptops or computer systems with mobile communication components, and/or any device that is operable to communicate wirelessly. The UE 1 includes transmitter/receiver unit(s) 804 connected to at least one antenna 802 (together defining a communication unit) and a controller 806 having access to memory in the form of a storage medium 808. The controller 806 may be, for example, Microprocessor, digital signal processor (DSP), application-specific integrated circuit (ASIC), field-programmable gate array (FPGA), or other logic circuitry programmed or otherwise configured to perform the various functions described above, such as estimating the handover trigger in the manner outlined above. For example, the various functions described above may be embodied in the form of a computer program stored in the storage medium 808 and executed by the controller 806. The controller 806 may perform the estimation in the second embodiment as discussed previously. The transmission/reception unit 804 is arranged, under control of the controller 806, to receive signals from the cells permitting measurement of received power and so forth as discussed previously.

Figure 7:
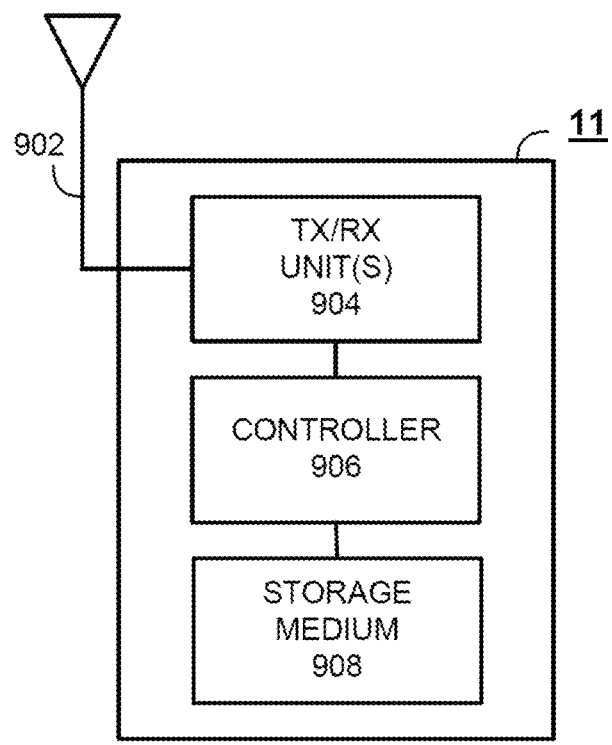
FIG. 7 is a schematic block diagram of a base station for use in the present invention.

FIG. 7 is a block diagram illustrating an example of a base station 11 to which the present invention may be applied. The base station includes transmitter/receiver unit(s) 904 connected to at least one antenna 902 (together defining a communication unit) and a controller 906. The controller may be, for example, Microprocessor, DSP, ASIC, FPGA, or other logic circuitry programmed or otherwise configured to perform the various functions described above, such as performing the estimation in the first embodiment (when the base station is providing the serving cell). For example, the various functions described above may be embodied in the form of a computer program stored in the storage medium 908 and executed by the controller 906. The transmission/reception unit 904 is responsible for transmission of reference signals, reception of signals from the UE 1 allowing the received power to be measured, and so on under control of the controller 906.

To summarise, embodiments of the present invention may provide a scheme to identify the uplink border between two neighbouring cells, especially one Macro cell and another Small Cell. The basis of the invention is to define a trigger event which can be configured for a connected mode UE, such that the UE would be triggered to send the measurement report about the neighbouring cell(s) when the condition is fulfilled. Such a measurement report can be used by the current serving eNB to decide whether one or more neighbouring cells should be activated or handed-over to and/or whether certain information should be sent to one or more neighbouring eNBs so that they can start monitoring the uplink connection quality of the UE.

Various modifications are possible within the scope of the present invention.

In embodiments of the present invention, it is first estimated whether the novel trigger is fulfilled, and if so the action triggered is to initiate measurements by neighbour cells so as to allow the uplink border to be established accurately and thereafter a handover or secondary cell activation decision to be made.

Alternatively it would be possible to employ the estimation as a basis for the decision itself, without determining the uplink border accurately on the basis of neighbour cell UL measurement.

As should be apparent from the above, whilst a conventional handover of a UE involves both UL and DL, the present invention is concerned with measurement prior to secondary cell activation on the UL, which may be viewed as equivalent to handover of all or part of the UL connectivity of a given UE. The DL meanwhile can be considered separately as appropriate by use of techniques known in the art, with for example at least one serving cell and with possible assistance from one or more secondary cells, which may or may not be the same cells as used on the uplink.

As already mentioned, the term "cells" in the above description is to be interpreted broadly. Cells need not each have a different geographical area, or a different base station. In general, cells can be defined on a downlink, uplink, or on both.

Although the above embodiments consider a heterogeneous network scenario, the present invention is applicable to any situation in wireless communication where there is an imbalance between UL and DL.

INDUSTRIAL APPLICABILITY

This invention is particular beneficial for heterogeneous networks where due to power imbalance there exist different uplink and downlink cell borders. The invention can efficiently identify the uplink border in addition to the conventional downlink cell border. Therefore it makes it possible in an efficient manner to maintain connectivity to both Macro and Small Cell(s) simultaneously and to employ, for example one cell for uplink connectivity and another for downlink. On both uplink and downlink, the best suitable cells with the highest signal strength can be chosen to achieve highest throughput. In addition, this mechanism can also reduce the interference in co-channel cases.

What is claimed is:

1. A wireless communication method wherein a terminal is within wireless communication range of at least one serving cell with which the terminal has at least uplink communication, and at least one neighbour cell with which the terminal has no uplink communication, the cells controlled by one or more base stations and transmitting at least reference signals for reception by the terminal, the method comprising: at the terminal, transmitting signals on the uplink to the serving cell, and measuring signals received from the cells; at a base station of the serving cell, measuring signals received on the uplink from the terminal; and the method further comprising: determining, based on information about the transmitted and received signals, that the terminal is in the vicinity of an uplink border between the serving cell and neighbour cell at which signal strength of the neighbour cell becomes an offset better than the serving cell on the uplink; said determining being performed either: at the base station of the serving cell, wherein information about the transmitted and received signals includes: information about transmitted power of the neighbour cell's transmitted signal received by the base station from the neighbour cell's, and information from the terminal about transmitted power of the signals transmitted by the terminal and the received power of the signals received from the cells: or at the terminal, wherein information about the transmitted and received signals includes: information from the serving cell about transmitted power of the serving cell's transmitted signals received by the terminal, information from the serving cell or from the neighbour cell about the transmitted power of the neighbour cell's transmitted signals, and information from the serving cell about the received power of the terminal's uplink communication.

2. The method according to claim 1 further comprising, in response to the determining, the terminal sending a report to the base station of the serving cell.

3. The method according to claim 1 further comprising the base station of the serving cell causing the neighbour cell to activate uplink wireless communication in at least one application of the terminal.

4. The method according to claim 1 further comprising, in response to the determining, the base station of the serving cell causing the neighbour cell to measure signals received from the terminal.

5. The method according to claim 4 wherein the serving and neighbour cells are controlled by first and second base stations respectively, the first and second base stations arranged for mutual communication, the first base station sending a request to the second cell base station to measure said signals and/or to activate said uplink wireless communication.

6. The method according to claim 5 wherein the second base station controls a plurality of cells and the request from the first base station at least identifies the neighbour cell which was the subject of the determining.

7. The method according to claim 1 wherein the determining is performed at the base station of the serving cell.

8. The method according to claim 1 wherein the determining is performed at the terminal.

9. The method according to claim 1 wherein the determining comprises estimating the received power of the terminal's uplink communication at the neighbour cell and associating the estimated received power with the received power of the signal received from the neighbour cell.

10. A wireless communication system comprising: one or more base stations which control cells for wireless communication; and a terminal arranged for at least uplink communication with at least one serving cell among said cells; and to detect reference signals from the serving cell and from at least one neighbour cell, wherein: the terminal is arranged to transmit signals on the uplink to the serving cell; and to measure signals received from the cells; the base station controlling the serving cell is arranged to measure signals received on the uplink from the terminal; and the system includes means for determining, based on information about the transmitted and received signals, that the terminal is in the vicinity of an uplink border between the serving cell and neighbour cell at which signal strength of the neighbour cell becomes an offset better than the serving cell on the uplink; said means for determining being provided either: at the base station of the serving cell, wherein information about the transmitted and received signals includes: information about transmitted power of the neighbour cell's transmitted signals received by said means for determining from the neighbour's cells, and information from the terminal about transmitted power of the signals transmitted by the terminal and the received power of the signals received from the cells; or at the terminal, wherein information about the transmitted and received signals includes: information from the serving cell about transmitted power of the serving cell's transmitted signals received by said means for determining, information from the serving cell or from the neighbour cell about the transmitted power of the neighbour cell's transmitted signals, and information from the serving cell about the received power of the terminal's uplink communication.

11. The system according to claim 10 wherein the serving and neighbour cells are controlled by first and second base stations respectively, the first and second base stations are arranged for mutual communication, and the first base station is arranged to send a request to the second cell base station to measure signals received from the terminal.

12. A base station for providing a serving cell of a terminal in a wireless communication system, the terminal arranged for at least uplink communication with the serving cell and to detect reference signals from the serving cell and from at least one neighbour cell in the system, wherein: the base station is arranged to take measurements of signals received on the uplink from the terminal, to receive reports from the terminal and from a base station of the neighbour cell, and to determine, based on the measurements and reports, that the terminal is in the vicinity of an uplink border between the serving cell and the neighbour cell at which signal strength of the neighbour cell becomes an offset better than the serving cell on the uplink: wherein the base station is further arranged to determine that the terminal is in the vicinity of the uplink border by utilizing the measurements and reports which includes: information about transmitted power of the neighbor cell's transmitted signals received from the neighbor cells, and information from the terminal about transmitted power of the signals transmitted by the terminal and the received power of the signals received from the cells.

13. A non-transitive computer-readable recording medium on which is recorded software which, when executed by a processor of radio equipment, provides the base station of claim 12.

14. A terminal for use in a wireless communication system, the system comprising one or more base stations which control cells for wireless communication; the terminal arranged for at least uplink communication with at least one serving cell among said cells, and to detect reference signals from the cells including at least one neighbour cell, wherein: the terminal is arranged to transmit signals on the uplink to the serving cell, to take measurements on signals received from the cells, to receive, from at least the base station controlling the serving cell, reports on signals transmitted from the cells and to determine, based on the measurements and reports, that the terminal is in the vicinity of an uplink border between the serving cell and neighbour cell at which signal strength of the neighbour cell becomes an offset better than the serving cell on the uplink; wherein: the terminal is further arranged to determine that the terminal is in the vicinity of the uplink border by utilizing the measurements and resorts which includes: received information from the serving cell about transmitted power of the serving cell's transmitted signals, information from the serving cell or from the neighbour cell about the transmitted power of the neighbour cell's transmitted signals, and information from the serving cell about the received power of the terminal's uplink communication.

* * * * *